ELECTRONIC SINGLE-POLE, DOUBLE-THROW SWITCH
Filed Dec. 29, 1967
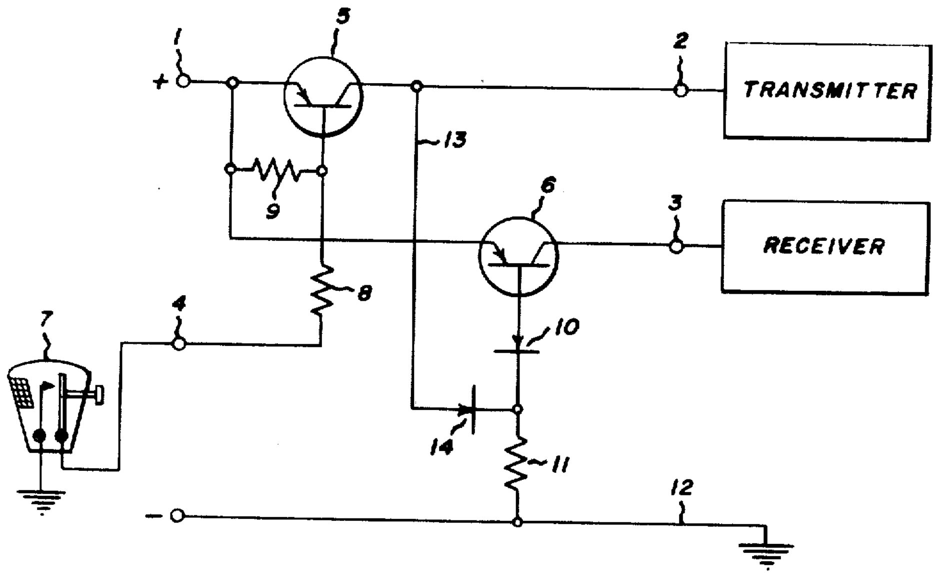
INVENTOR:
WILLIAM G. MUSTAIN,
BY I David Blumenfeld
HIS ATTORNEY.

United States Patent Office

3,543,053

Patented Nov. 24, 1970

3,543,053

ELECTRONIC SINGLE-POLE, DOUBLE-THROW SWITCH

William G. Mustain, Lynchburg, Va., assignor to General Electric Company, a corporation of New York Filed Dec. 29, 1967, Ser. No. 694,516
Int. Cl. H03k *5/08, 17/00*
U.S. Cl. 307—254 6 Claims

ABSTRACT OF THE DISCLOSURE

An electronic single-pole, double-throw switch having a positive interlock feature for selectively switching a supply voltage between the transmitter and receiver in response to actuation of the push-to-talk switch of the radio. A pair of transistor switches are connected between an input terminal and individual output terminals connected to the transmitter and receiver. The first transistor is controlled in response to a control voltage from the push-to-talk switch to bias it into conduction to supply operating voltage to the transmitter whenever the push-to-talk button is actuated. Actuation of this first transistor then automatically biases the transistor controlling the output line to the receiver into the non-conducting state, removing the bias voltage from the receiver. When the push-to-talk button is released, the first transistor again becomes non-conducting, removing the operating voltage from the transmitter and unclamping the second transistor to apply the operating voltage to the receiver. Thus, the operating voltage is applied to the receiver at all times except when the push-to-talk button is actuated and the control voltage is applied to the switch.

This invention relates to a switching circuit and, more particularly, to a solid-state, single-pole, double-throw circuit for selectively switching operating voltage in a radio system.

Typically, most two-way mobile radio systems are operated in a simplex mode with either the transmitter or the receiver energized at any given time. Operating or supply voltage must, therefore, be switched selectively between the transmitter and receiver as the radio switches between the talk and receive modes. Normally, operating voltage is continuously applied to the receiver to condition it to receive any message and is switched to the transmitter whenever the push-to-talk button is depressed as the operator is about to transmit. In the past, switching of the supply voltage between the transmitter and receiver has been carried out by actuating an electromechanical relay of the single-pole, double-throw type, so that the supply voltage is switched between the transmitter or the receiver contacts. Relay devices, of course, are subject to the usual shortcomings of all electromechanical devices in that they are susceptible to failure in shock or vibration, or through arcing or pitting of the contacts. Furthermore, electromechanical relays are of a size and bulk which makes their use difficult where microelectronic fabrication techniques are to be utilized for the entire radio. The need, therefore, exists for an all-solid-state, single-pole, double-throw switch arrangement for a transmitter-receiver combination which is highly reliable, and is of a size and bulk which make it particularly applicable for microelectronic circuitry.

It is, therefore, a primary objective of this invention to provide a solid-state, single-pole, double-throw switching device.

Another objective of this invention is to provide a solid-state electronic switching element for selectively switching a voltage source between two output terminals in response to the presence or absence of a control signal.

Other objectives and advantages of the instant invention will become apparent as the description thereof proceeds.

In accordance with the invention, the solid-state, single-pole, double-throw switch is connected between an input terminal connected to a supply source, an input control terminal connected to a push-to-talk switch of the receiver, and comprises a pair of transistors connected respectively between the supply input terminal and one of two output terminals. The conductivity of one of the transistors is controlled from the push-to-talk switch to connect the supply voltage to the first output terminal whenever the push-to-talk switch is actuated. This transistor is so connected to the remaining transistor as to clamp it into the non-conducting state whenever a control signal is present at the control terminal causing the first transistor to conduct. In the absence of the control signal, the first transistor is not conducting, and the second transistor is in the conducting state, thereby connecting the second output terminal to the input supply terminal. Hence, the supply voltage is alternately connected to one or the other of the output terminals, which are respectively connected to the transmitter and the receiver, in response to the presence and absence of the control signal.

The novel features which are believed to be characteristic of this invention are set forth with particularity in the appended claims. The invention, itself, both as to its organization and method of operation, together with further objects and advantages thereof, may best be understood in connection with the accompanying drawings, in which:

The sole figure is a schematic circuit diagram of the single-pole, double-throw, electronic switch.

The single-pole, double-throw, solid-state switch illustrated in FIG. 1 connects an input voltage source, such as the common power supply in a vehicular radio, at a first input terminal 1, alternately to one of two output terminals 2 and 3, connected respectively to the transmitter and receiver of the vehicular radio. The supply voltage is alternately connected to these output terminals by selectively driving transistors 5 and 6, connected between input terminal 1 and output terminals 2 and 3 into conduction. Transistor 5 is a normally non-conducting PNP transistor which is biased into conduction in response to the appearance of a control voltage, such as ground potential, at control input terminal 4, which is connected directly to the push-to-talk switch of microphone shown generally at 7. The collector-emitter path of transistor 5 is connected in series between input terminal 1 and output terminal 2, and the base is connected through a current-limiting resistor 8 to control terminal 4 and the push-to-talk switch of the microphone. A leakage resistor 9 is connected between the base and emitter of the transistor 5 to dissipate the leakage collector current of this transistor. PNP transistor 6 has its emitter-collector path connected in series between input terminal 1 and output terminal 3 and its base connected through a diode 10 and a current-limiting resistor 11 to ground bus 12.

Transistors 5 and 6 are so interconnected through lead 13 and diode 14 to clamp transistor 6 into the non-conducting state, thereby removing the supply voltage from output terminal 3, whenever transistor 5 is driven into the conducting state by the appearance of the control voltage at terminal 4. Diode 14 is provided to prevent a voltage at output terminal 2 when transistor 6 is conducting. In the absence of this diode, it may be seen that output terminal 2 is connected directly to the base of transistor 6; and with transistor 6 in the saturated state, the voltage at the base of transistor 6 is only slightly negative with respect of the emitter, so that the base is substantially at the supply voltage at input terminal 1. Without diode 14, the supply voltage would also be present at output terminal 2, even though transistor 5 is in the non-conducting state. Diode 14, however, is so poled that it becomes non-conducting when transistor 6 conducts, thereby preventing any output at terminal 2. Diode 10 is provided, as will be pointed out in detail presently, to cancel the effects of the forward voltage drop across diode 14 in order to make certain that transistor 6 does not conduct when transistor 5 is conducting.

Under normal operation with the push-to-talk switch 7 not actuated, the base of transistor 5 is positive, there being no ground connection through switch 7. Transistor 5 is not conducting, and the resistance of its emitter-collector path is sufficiently high so there is no output voltage at terminal 2. The collector of transistor 5 is, therefore, essentially at ground potential. The anode diode 14 is connected to the collector of transistor 5 and the cathode to the junction of diode 10 and resistor 11 in the base circuit of transistor 6, which is conducting. In this condition, the cathode of diode 14 is more positive than its anode and it is biased into the non-conducting state. Transistor 6, on the other hand, is in the conducting state, with its emitter connected directly to the positive voltage at input terminal 1 and its base connected through diode 10 and resistor 11 to the ground bus. It may be seen that diode 10 is poled to be in the conducting state, so that the base of transistor 6 is connected to ground potential, forward-biasing the base-emitter junction and driving transistor 6 into the saturated state. The resistance of emitter-collector path is very low and input terminal 1 is effectively connected to output terminal 3 supply operating voltage to the receiver. The receiver is thus maintained in the energized state as long as the push-to-talk switch is not actuated. When the push-to-talk switch in microphone 7 is actuated, ground potential is applied to input terminal 4 and to the base of transistor 5. The base-emitter junction of transistor 5 is now forward-biased and transistor 5 is driven into the saturated state. The voltage at the collector now rises substantially to the voltage at the input terminal, and diode 14 is driven into conduction. The positive voltage at the collector of transistor 5 is applied to the junction of diode 10 and resistor 11, reverse-biasing the base-emitter junction of transistor 6. This drives transistor 6 into cut-off, removing the supply voltage from terminal 3. Thus, with the application of a control voltage, in this instance ground potental, to control terminal 4, transistor 5 is switched into the conducting state to transfer the supply voltage from output terminal 3 to output terminal 2, while simultaneously clamping transistor 6 into the non-conducting state as long as the control voltage is present at input terminal 4 and transistor 5 is conducting.

As was pointed out previously, diode 14 must be provided to prevent any output at terminal 2 when transistor 6 is conducting. The presence of diode 14 requires that another diode 10, poled for the opposite direction of current flow, be provided in the base path of transistor 6 to ensure that transistor 6 is cut off when transistor 5 is conducting. That is, when transistor 5 is driven into the saturated state by the application of the control signal at terminal 4, the voltage drop across the emitter-collector path of transistor 5 is very low, approximately 0.1 of a volt. Hence, the collector of transistor 5 in the saturated state is only about 0.1 of a volt more negative than the emitter of the transistor, i.e., it is only 0.1 volt more negative than the potential at input terminal 1, to which the emitter of transistor 6 is also connected. However, the voltage drop across diode 13 is approximately 0.6 of a volt, so that the point in a base circuit to which the cathode of diode 13 is connected is approximately 0.7 of a volt more negative than input terminal 1 and the emitter of transistor 6. Thus, in the absence of diode 10, the base of transistor 6 would be about 0.7 of a volt more negative than the emitter, which may be sufficient to forward-bias the base-emitter junction of transistor 6, even though transistor 5 is in the conducting state. In the absence of diode 10, therefore, transistor 6 would remain in the conducting state due to the fact that the sum of the voltage drops across the emitter-collector path of transistor 5 and across diode 14, makes the base of transistor 5 sufficiently negative to forward-bias the base-emitter junction. However, by providing a diode 10 in the base circuit of transistor 6 which is poled for an opposite direction of current flow, the voltage drop across diode 10 is the opposite to that across diode 14. Thus, the voltage at the base of transistor 6 is 0.6 of a volt more positive than the voltage at the junction of the cathodes of diodes 10 and 14, so that the voltage at the base of transistor 6 is only 0.1 of a volt more negative than the emitter when transistor 5 is conducting, which is insufficient to forward-bias the base-emitter junction. Thus, transistor 6 is clamped into the non-conducting state as soon as transistor 5 is driven into conduction by the appearance of the control signal at input terminal 4.

It will be apparent that the electronic, solid-state, single-pole, double-throw, switching arrangement described and illustrated in the instant application is effective, reliable, simple in construction, requires a minimum number of components, and is small in size.

While a particular embodiment of this invention has been shown, it will, of course, be understood that the invention is not limited thereto, since many modifications, both in the circuit arrangement and in the instrumentalities employed, may be made. It is contemplated by the appended claims to cover any such modifications as fall within the true spirit and scope of this invention.

What is claimed as new and desired to be secured by Letters Patent is:

1. An improved single-pole, double-throw switch comprising:

(a) first, second, and third terminals;
(b) a first transistor having an emitter-collector path and a base;
(c) means connecting said emitter-collector path of said first transistor between said first and second terminals;
(d) means connected to said base of said first transistor to selectively render said emitter-collector path of said first transistor conductive;
(e) a second transistor having an emitter-collector path and a base;
(f) means connecting said emitter-collector path of said second transistor between said first and third terminals;
(g) first and second diodes serially connected in opposing polarity between one side of said emitter-collector path of said first transistor and said base of said second transistor, so that conduction in said emitter-collector path of said first transistor renders said emitter-collector path of said second transistor non-conductive;
(h) and means connected to said serially connected diodes to render said emitter-collector path of said second transistor normally conductive.

2. The improved switch of claim 1 wherein said diodes are connected to said emitter-collector path of said first transistor on the side nearer said second terminal.

3. The improved switch of claim 1 wherein said transistors are PNP-type transistors having their emitters connected to said first terminal, and wherein said diodes are connected to the collector of said first transistor.

4. The improved switch of claim 3 wherein said means to render said second transistor normally conductive comprises a resistor connected to the junction of said diodes.

5. The improved switch of claim 3 wherein said first terminal is adapted to be connected to a voltage source, said second terminal is adapted to be connected to a transmitter, and said third terminal is adapted to be connected to a receiver.

6. The improved switch of claim 5 wherein said means to render said second transistor normally conductive comprises a resistor connected to the junction of said diodes.

References Cited

UNITED STATES PATENTS 3,153,729 10/1964 Leakey ---------- 307—254 X
3,182,202 5/1965 Hesketh ---------- 307—244 X JOHN S. HEYMAN, Primary Examiner R. P. DAVIS, Assistant Examiner U.S. Cl. X.R.

307—237, 244